W. VON PHUL.
WAREHOUSE AND TERMINAL.
APPLICATION FILED AUG. 30, 1915.

1,247,040.   Patented Nov. 20, 1917.
8 SHEETS—SHEET 1.

W. VON PHUL.
WAREHOUSE AND TERMINAL.
APPLICATION FILED AUG. 30, 1915.

1,247,040.

Patented Nov. 20, 1917.
8 SHEETS—SHEET 2.

W. VON PHUL.
WAREHOUSE AND TERMINAL.
APPLICATION FILED AUG. 30, 1915.

1,247,040.

Patented Nov. 20, 1917.
8 SHEETS—SHEET 3.

W. VON PHUL.
WAREHOUSE AND TERMINAL.
APPLICATION FILED AUG. 30, 1915.

1,247,040.

Patented Nov. 20, 1917.
8 SHEETS—SHEET 4.

UNITED STATES PATENT OFFICE.

WILLIAM von PHUL, OF NEW ORLEANS, LOUISIANA.

WAREHOUSES AND TERMINAL.

1,247,040.  Specification of Letters Patent.  Patented Nov. 20, 1917.

Application filed August 30, 1915. Serial No. 48,116.

*To all whom it may concern:*

Be it known that I, WILLIAM VON PHUL, a citizen of the United States, residing in the city of New Orleans, parish of Orleans, and State of Louisiana, have invented certain new and useful Improvements in Warehouses and Terminals; and I do hereby declare the following to be a full, clear, and exact description of the invention, such as will enable others skilled in the art to which it appertains to make and use the same.

The present invention relates to the construction of warehouses and terminals constituting a plant for receiving, storing, shipping and handling different commodities, such as cotton, sugar, grain and the like.

It is the object of the invention to provide a plant of the above character designed to handle commodities on a relatively large scale and in a systematic manner. The plant herein disclosed was designed for the purpose of conveniently handling and storing the entire quantity of cotton passing through one of the largest cotton ports in the country, and for this reason it is so designed as to facilitate the handling of commodities in very large quantities. The improved plant may be used for handling other commodities than cotton but for the sake of simplicity, it will be described only in connection with the handling of cotton.

The form of the plant herein disclosed, is designed to receive the cotton shipped to the plant by boat for interior transportation, or to receive cotton transported to the plant by train from interior points for shipment by boat to points of destination. Obviously, however, the cotton brought to the plant by boat may be removed by boat, and that transported to the plant by train may be removed by train.

The plant comprises a plurality of warehouses or storage buildings in which the cotton may be stored temporarily or for a given length of time, depending upon the nature of the cotton shipment. These warehouses are conveniently situated with respect to a wharf and are provided with loading and unloading devices for loading and unloading the cotton from the ships, and a plurality of vehicular runways place the wharf in communication with all of the warehouses.

The plant is further provided with additional buildings used for so-called sorting and sampling sheds. A compress conveniently situated with respect to the other buildings of the plant renders it possible to compress the cotton if received in a "flat" or loose condition. The sorting sheds and compress are positioned in a certain relation with respect to each other and with respect to the other buildings of the plant as will hereinafter appear.

In the preferred form of the plant, the wharf is made two stories in height and therefore comprises a ground level and an elevated level. The elevated level of the wharf is placed in communication with the warehouses by means of a plurality of elevated runways running back from the wharf adjacent the buildings of the plant. Other elevated runways pass transversely of the plant and connect the first mentioned runways so that any part of any building may be reached from the wharf by means of the interconnected runways. Beneath the above mentioned elevated runways are located platforms which serve the purpose hereinafter described.

The railroad tracks pass through the plant under the elevated runways and on substantially the same level as the ground level of the wharf. The railroad tracks may be divided in groups which pass between the buildings of the plant so that if desired, cotton may be transferred from a building in one part of the plant to a building in another part of the plant by switching a train onto the proper tracks. The chief means, however, of transporting the cotton from place to place in the plant comprises a plurality of self-propelled trackless trains adapted to pass over the vehicular runways above referred to and convey the cotton from the wharf to any part of any building in the plant, or vice versa.

Each of the warehouses is divided into a plurality of cells or compartments in which the cotton may be stored. The corresponding cells or compartments of the several buildings are in alinement so that a crane track passing through each set of alined compartments permits the cotton to be conveyed to or removed from any one of such compartments to one of the runways adjacent the end of one of the compartments. At this point the cotton may be loaded onto or unloaded from one of the self-propelled trains above mentioned and transferred to the wharf or any other point of destination in the plant. There are, therefore, a plurality of continuous crane tracks passing through all of the buildings of the plant, each of which crane tracks passes through one cell or compartment in each of the buildings. In order to permit the cotton to be transferred from a compartment in one building to a compartment in the same or other building, there is provided a transfer crane track running transversely of the above mentioned crane tracks so that a crane may be transferred from any one of the crane tracks passing through the compartments to any remaining crane track.

Various other features of the plant will be disclosed as the specification proceeds and the above mentioned features will be described more in detail with reference to the accompanying drawings which illustrate the improved plant in its preferred form. The plant shown in the drawings is designed especially for handling cotton but as above stated, it may be used as it stands for handling other commodities, or may be sufficiently revised to suit requirements without departing from the spirit or scope of the invention.

Figure 2:
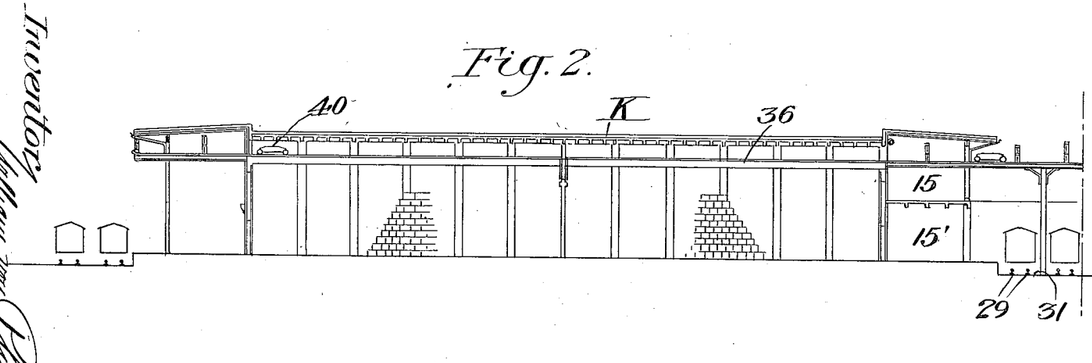
Figs. 2, 2ª, 2ᵇ and 2ᶜ in conjunction represent a similar section taken through one of the longitudinal runways.
Figure 2A:
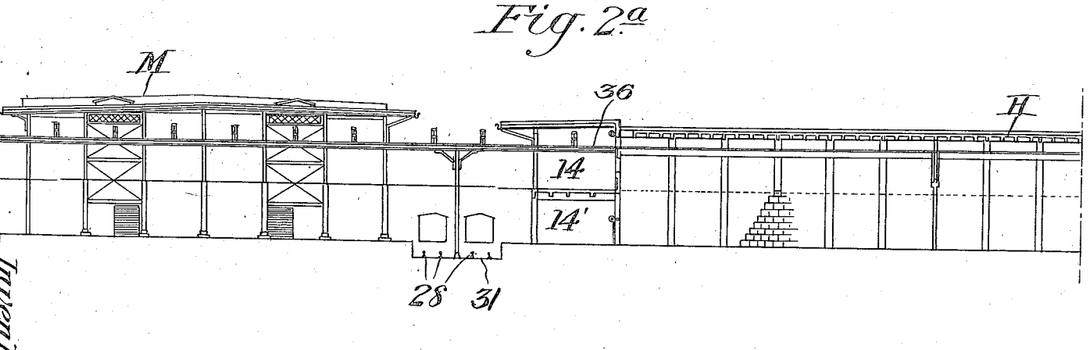
Figure 3:
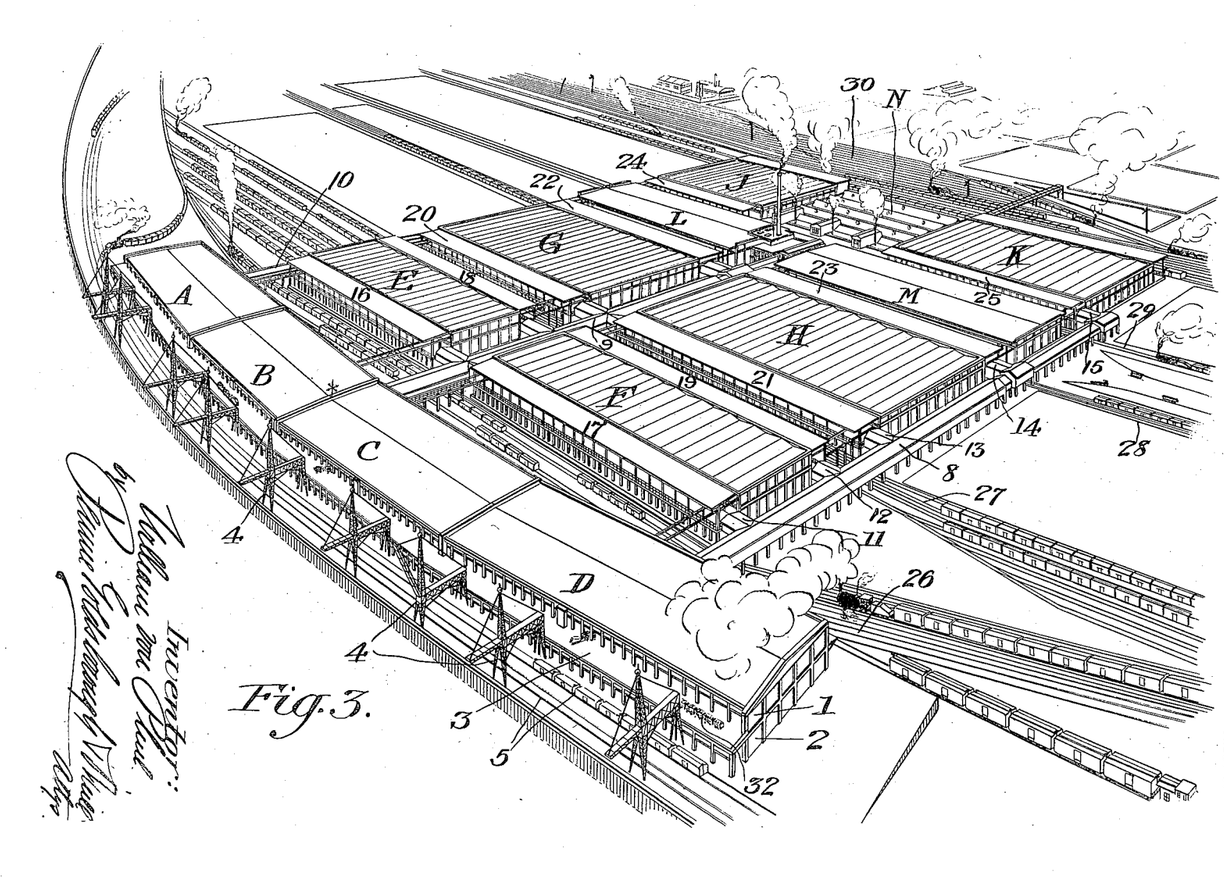
Fig. 3 is a perspective view of the entire plant.

Referring to the drawings, and particularly to Fig. 3, it will be noted that the wharf comprises a plurality of connected and communicating sheds A, B, C and D. The wharf is two stories in height, the upper story being indicated at 1 and the lower story at 2. The floor of the upper story is elevated above the ground level and extends farther toward the water-front than the roof of the wharf to provide an open balcony as shown at 3 to facilitate loading and unloading ships at the wharf. A plurality of loading and unloading devices such as the conveyers 4 and cranes 4' (Figs. 1ᶜ and 2ᶜ) may be provided for unloading the cotton from the ships and depositing it on the balcony 3 or directly in the self-propelled trains or other vehicles, or for loading the cotton onto the ships from the wharf. Preferably one set of train tracks passes in front of the wharf along the water's edge as indicated at 5.

Figure 1:
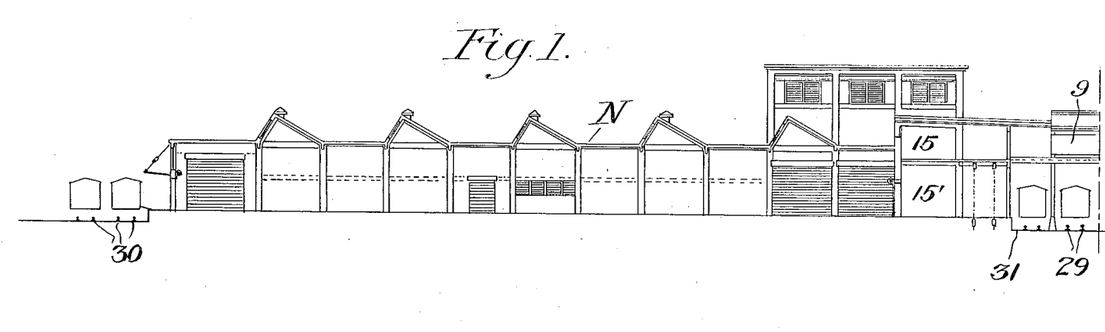
Figures 1, 1ª, 1ᵇ and 1ᶜ in conjunction represent a longitudinal section through one series of buildings of the plant.
Figure 1A:
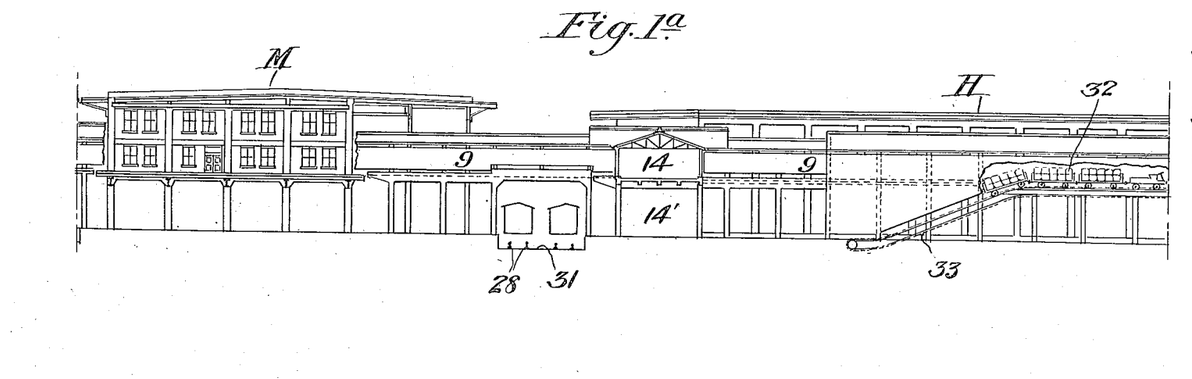

The detail construction of the wharf is immaterial to the present invention but preferably the buildings of the wharf are supported upon a concrete foundation or supporting structure, denoted generally by the reference character 6 in Figs. 1ᶜ and 2ᶜ. The portion of the wharf in front of the sheds or buildings A, B, C and D and over which the train tracks pass is constructed of wood. This portion of the wharf is indicated at 7 in Figs. 1ᶜ and 2ᶜ and serves not only to support the railroad tracks 5 and the loading and unloading appliances such as the conveyers 4, but also serves as a flexible buffer between the ships and the main masonry of the wharf.

The warehouses of the plant are, in the form of the plant disclosed, arranged in pairs, one pair being shown at E, F. These two building are designed to receive the cotton known as "through" cotton. The second pair of warehouses is shown at G, H, each of the buildings of which is designed to receive the cotton known as "F. O. B." cotton. The third pair of warehouses is shown at J, K and these buildings are intended to receive the "consigned" cotton.

Disposed between the pair of warehouses G, H and the pair of warehouses J, K, are two so-called sorting sheds L and M, and between the warehouses J and K is situated the compress denoted generally by the reference character N.

It will be noted that each of the warehouses in the plant has only one story but that the single story is substantially equal in height to the two stories of the wharf and runways. The floor of the second story of the wharf is placed in communication with the warehouses by means of elevated runways. In Fig. 3 the longitudinal runways, or the runways passing back through the plant from the wharf, are indicated at 8, 9 and 10. It will be noted that these runways are inclosed but communicate with a plurality of transverse runways, there being a transverse runway at the front or rear of each of the buildings of the plant except the warehouses J and K which are provided with only one transverse runway passing the front of these buildings. The transverse runways for the buildings E and F are shown at 11 and 12, those for the buildings G and H at 13 and 14, and the single transverse runway for the buildings J and K is shown at 15. The transverse runway adjacent each of the warehouses is formed in part by a vehicular balcony, the front balconies for the buildings E and F being shown at 16 and 17, respectively, and the rear balconies for the same buildings being shown at 18 and 19, respectively. It will be noted that the balconies 16 and 17 constitute a part of the transverse runway 11, and the balconies 18 and 19 constitute a part of the transverse runway 12. Likewise the warehouses G and H are provided with front balconies 20 and 21 respectively, and rear balconies 22 and 23 respectively. The front balconies 20 and 21 form a part of the transverse runway 13 and the rear balconies 22 and 23 form a part of the transverse runway 14. The warehouses J, K are similarly provided with front balconies 24 and 25 forming a part of the transverse runway 15.

It will be noted that all of the above mentioned balconies are covered so that the vehicles passing from the wharf to any part of any of the buildings of the plant are protected at all times. By this arrangement of runways, it is obvious that any part of any warehouse in the group may be quickly and conveniently reached from the wharf, or on the other hand the wharf may be conveniently and quickly reached from any part of any of the buildings of the group, it being understood that the self-propelled trains above referred to or any other vehicles may pass over the runways to convey the cotton from the wharf to the buildings, or vice versa.

The platforms above referred to located beneath the elevated runways 11, 12, 13, 14 and 15 are best shown in Figs. 2, 2ª, 2ᵇ and 2ᶜ at 11′, 12′, 13′, 14′ and 15′ respectively. The longitudinal lower platforms are beneath the upper runways 8, 9 and 10 and the transverse lower platforms are beneath the floors of the balconies 16 and 17, 18 and 19, 20 and 21, 22 and 23, and 24 and 25.

The railroad tracks passing through the plant are divided into groups as above stated, one of such groups being shown at 26. The tracks of this group pass between the wharf buildings and the warehouses E and F, while the tracks of the group indicated at 27 pass between the warehouses E, F on the one hand, and G, H on the other hand. The group of tracks indicated at 28 pass between the warehouses G, H on the one hand and the sorting sheds L, M on the other, while still other tracks 29 may pass between the sorting sheds L, M on the one hand and the warehouses J, K on the other. The main railroad tracks may pass in back of the plant as indicated at 30. As will be noted from the sectional views through the plant, the railroad tracks passing transversely through the plant are preferably located in pits designated by 31 to bring the car platforms on substantially the same level with the platforms and ground floor of the warehouses. As all of the different groups of railroad tracks communicate, that is, as a train may be switched onto any certain group of tracks, the cotton may be transported from the wharf to any building of the plant or vice versa by train. As above stated, however, the chief means of moving the cotton from the wharf to the various buildings or vice versa, or from any point in the plant to any other point, comprises a plurality of self-propelled, trackless trains. Several of these trains are shown on the wharf at 32 in Fig. 3, and another is shown in Fig. 1ª and is referred to by the same reference character.

The trains 32 may comprise an electric locomotive and a plurality of trailers which may be loaded at various points in the plant and collected by the locomotive for hauling to its destination. The trains 32 may travel on any of the various platforms including the floors of the wharf and the upper and lower runways. It may be desirable to run one of these trains from one of the platforms or other point on the ground level of the plant to some point on the elevated runways or second floor of the wharf or vice versa, and for this purpose a plurality of inclines are provided, placing the elevated runways and upper floor of the wharf in such communication with the platforms and other lower points as to enable the trains to pass from either place to the other. It is preferable, however, not to depend upon the tractive force of the locomotive to pull the trains 32 up the inclines, nor to depend upon the locomotive to retard the movement of the train in passing down the inclines. A plurality of elevators and lowerators are therefore provided which may take the form of endless inclined conveyer belts which are power-driven and hence capable of elevating or lowering the trains 32 independently of the traction of the locomotive. These elevators and lowerators are preferably provided on the runways and wharf as shown in the drawings. The elevators just referred to are diagrammatically shown in Fig. 4 at 33 and the lowerators are diagrammatically shown in the same figure at 34. One of the elevators is shown in Fig. 1ª from which it will be noted that the trains 32 may pass onto the elevator or conveyer and be elevated to the level of the second floor of the runway. The elevators and lowerators permit the trains 32 to reach any point in the plant, irrespective of whether such point is located on the first or second floor of the plant.

The runways and platforms of the plant over which the trains 32 pass are designed for any kind of vehicular traffic and therefore the trains 32 need not be depended upon to transfer the cotton alone. Other motor vehicles, or even horse-drawn vehicles may be used if so desired for transferring the cotton from place to place.

Figure 4:
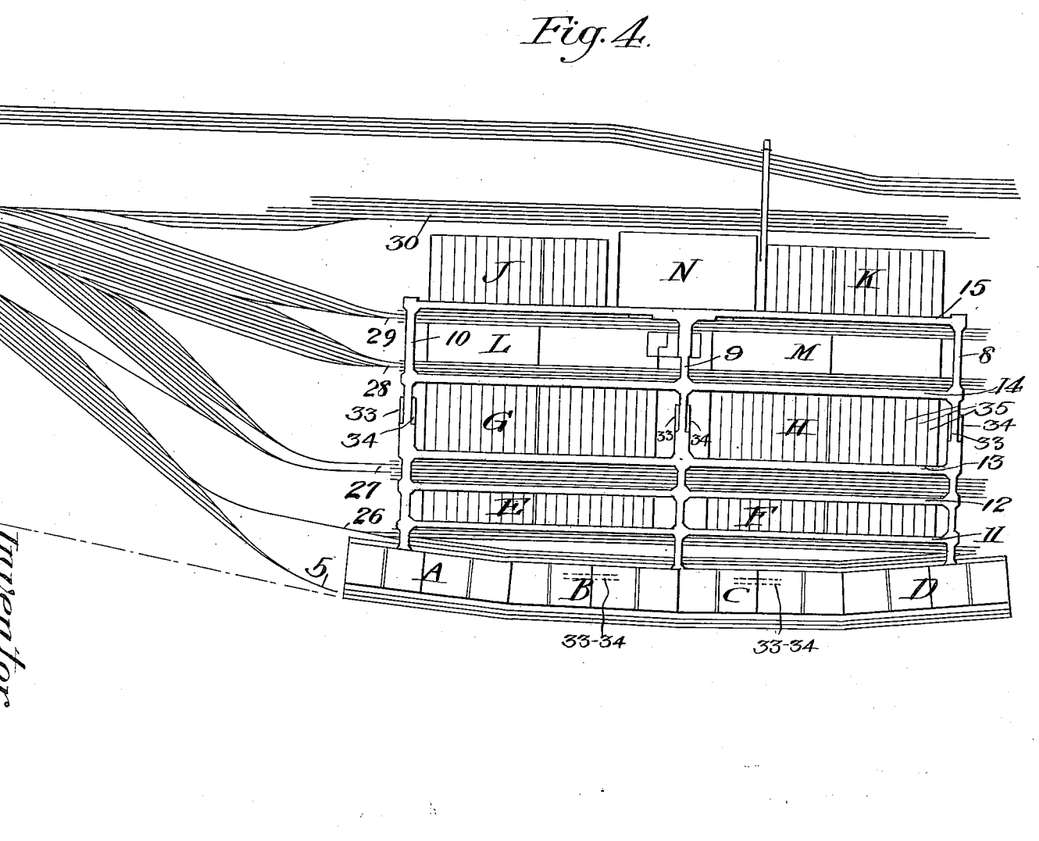
Fig. 4 is a more or less diagrammatic plan view showing the layout of the plant.
Figure 5:
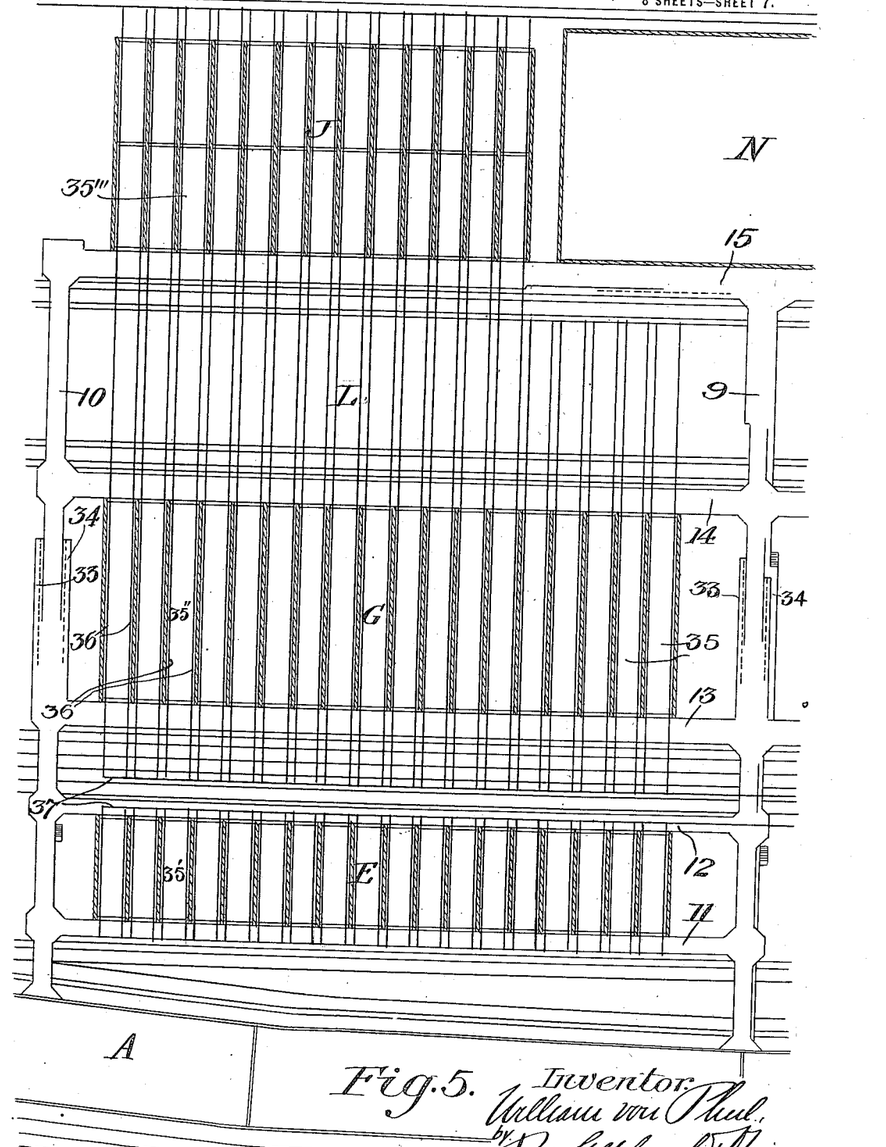
Fig. 5 is an enlarged diagrammatic plan view somewhat similar to Fig. 4 but showing only half the plant and illustrating the manner of disposing the crane tracks employed in the plant.
Figure 6:
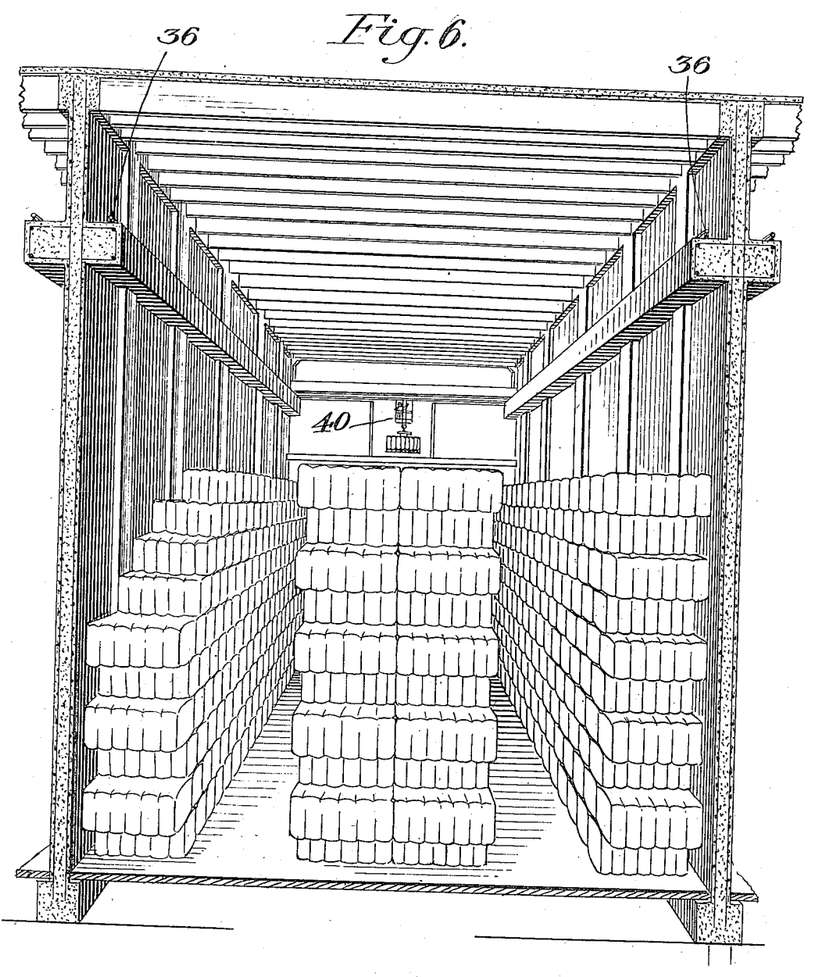
Fig. 6 is a vertical section through one of the compartments showing the interior of the compartment in perspective.

As above stated, each of the warehouses is divided into a plurality of storage compartments, said compartments being indicated diagrammatically in Figs. 4 and 5 at 35. Fig. 6 shows in perspective the interior of one of the compartments. As will be noted from the drawings, each compartment passes completely through the varehouse from the runway in front of the warehouse to the runway at the rear of the same. The compartments are open at each end as shown in Fig. 6 and communicate with the runways so that the cotton may be readily removed from a compartment and transferred to either floor of the runway, or vice versa.

In order to carry the cotton from the runways into the compartments or vice versa, a plurality of crane tracks are provided running north and south through the plant, it being understood that "north" and "south" designates the direction of the rear of the plant with respect to the wharf. One of these crane tracks is provided for each compartment and is continuous in length from the south side of buildings E and F to the north side of buildings J and K. Fig. 5 is intended to show more or less diagrammatically the arrangement of these crane tracks in one half of the plant. The other half being identical is not shown. Each crane track, comprising the two rails over which the crane passes, is indicated at 36. It will be noted that each track in traversing the entire length of the plant passes through all of the compartments in the various buildings which are in alinement. For instance, that one of the tracks 36 which is desiganted 36$^a$ passes from the south side of building E to the north side of building J, and in so doing passes through the compartment 35' of the building E, the compartment 35" of the building F, and the compartment 35''' of the building J. Likewise every other crane track passes through the alined compartments of the various buildings. It will be noted that the crane tracks 36 also pass through the sorting sheds L and M.

Figure 1B:
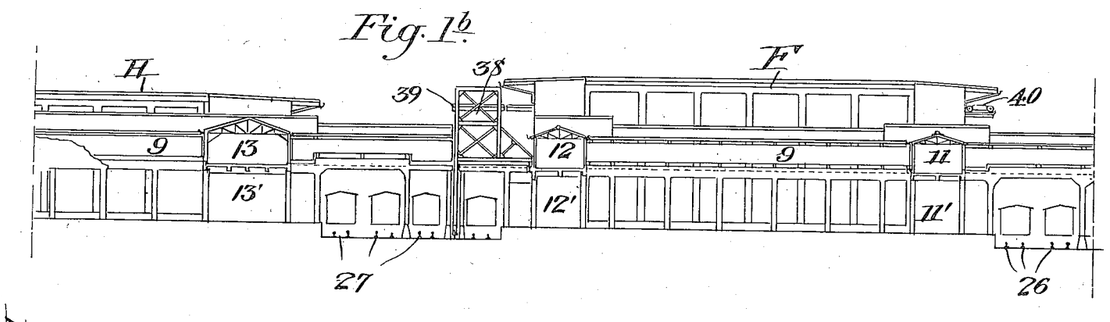
Figure 1C:
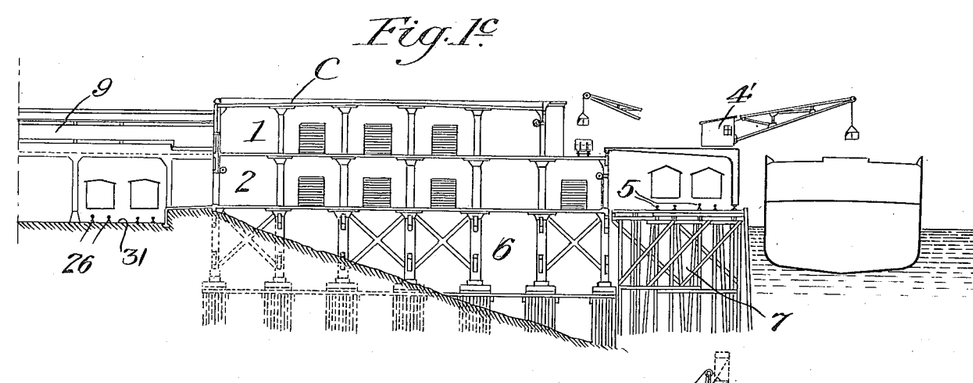
Figure 2B:
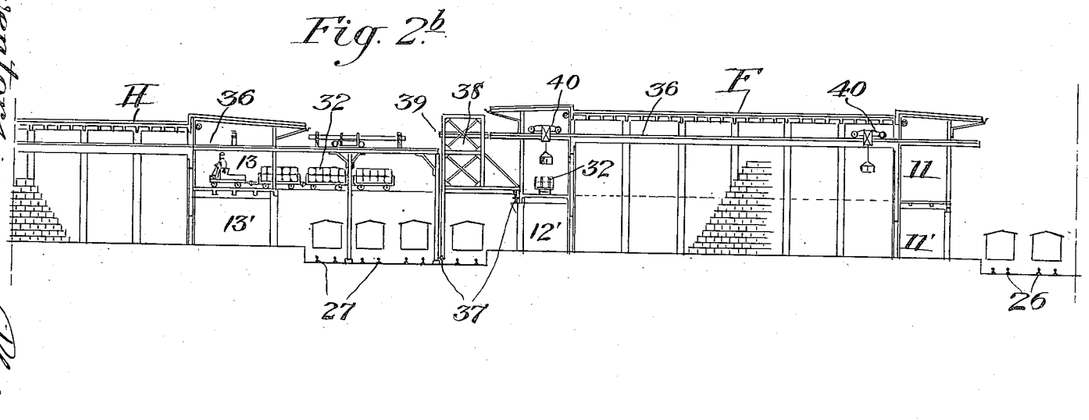
Figure 2C:
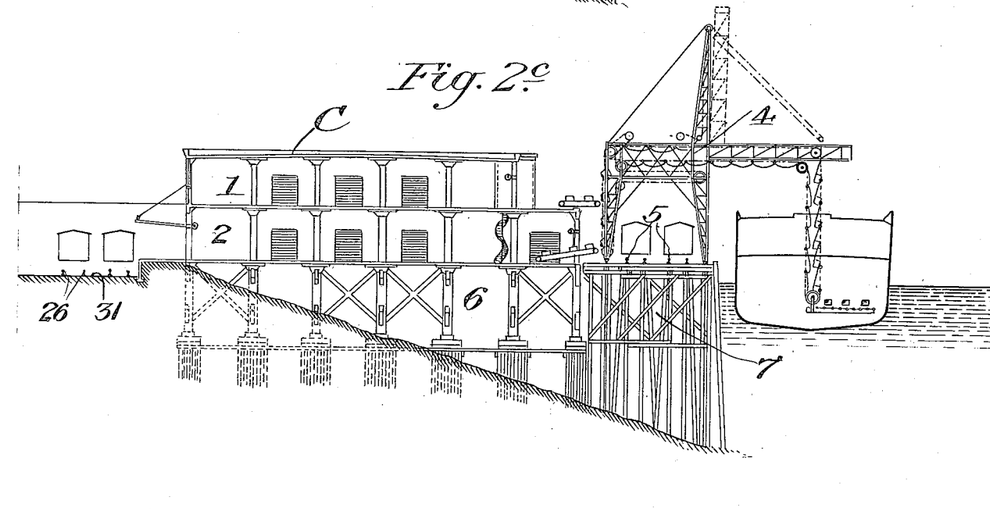

In order to permit switching of a crane from a track passing through one series of compartments to a track passing through another series, a transfer crane track is provided which passes transversely of the plant at right angles to the crane tracks 36. This transfer crane track is shown at 37 in Fig. 5 from which it will be noted that it is located immediately behind the buildings E and F. The end view of the crane transfer which operates upon the track 37 is shown in Figs. 1$^b$ and 2$^b$. The crane transfer itself is shown in these figures at 38 and comprises a carriage adapted to run upon the track 37. The carriage is provided with a track section 39 onto which the cranes pass and on which the cranes are supported while being transferred from one longitudinal crane track to the other.

As will be noted from Figs. 1$^b$ and 2$^b$, the portion of each longitudinal crane track located in the buildings E and F is elevated slightly above the level of the rear portion of the track. The crane transfer carriage 38 is therefore not only capable of moving the cranes transversely of the plant, but is capable of raising and lowering the cranes to bring the same from the level of the forward portion of the crane tracks to the level of the rear portions thereof, or vice versa.

Several of the cranes adapted to operate upon the crane tracks 36 are shown in Fig. 2$^b$ at 40, and an enlarged view of one of the cranes 40 is shown in Fig. 6. As will be noted from Fig. 6, the rails constituting the track upon which the cranes 40 operate, are supported near the top of the compartment so that the crane is capable of passing over the cotton stored in the compartment. The crane is capable of moving the cotton from the compartments to the runways or platforms, or vice versa, as indicated in Fig. 2$^b$, or the cranes may be utilized for transferring the cotton from any compartment in one part of the plant to any compartment in another part of the plant, in which event it may be necessary to call the crane transfer into use. Furthermore, it may be desirable to move the cotton by means of the cranes from the forward portion of the plant to the sorting sheds L and M, or vice versa.

As above intimated, the storage buildings of the plant are arranged in certain relation with respect to each other and with respect to the other buildings of the plant to facilitate handling of the cotton in accordance with the nature of the shipment. The exact arrangement of the buildings is immaterial so far as the broad aspects of the invention are concerned, but preferably the buildings E and F are designed to receive the "through" cotton. "Through" cotton is known as cotton which has been accumulated at interior points and has been sold at such points to the buyer for export direct and is consequently shipped from the interior point on a through bill of lading, combining both the railroad and water freight. This cotton is delivered by the railroad handling it to the plant, either directly to the wharf or, if the ship for which the cotton is intended is not in port, held by the railroad until the arrival of the ship and then delivered to the wharf. For these reasons, it is obviously advantageous to locate the buildings E and F for the "through" cotton close to the wharf.

The buildings G and H are designed to receive the "F. O. B." cotton or, in other words, the cotton that has been accumulated at interior points and sold on sample, subject to examination at the railroad depot. This class of cotton which has been compressed before shipment is unloaded by the railroad hauling it and stored in the shed at its terminal, where under certain circumstances it is entitled to free storage for a certain period of time. During this time the buyer is afforded proper facilities for examining the cotton and if it is accepted by the buyer, it is drayed at his expense to the wharf for export. The most logical place to situate the buildings for the "F. O. B." cotton is, therefore, at interior points of the plant which need not be as conveniently situated with respect to the wharf and the railroad tracks as other buildings of the plant. The "F. O. B." buildings should also be conveniently situated with respect to the sorting and sampling sheds L and M. It will be noted from Fig. 3 that this is true since the buildings G and H are located substantially at the middle part of the plant and are adjacent to the sorting sheds L and M.

The buildings J and K are designed to receive the "consigned" cotton which is the cotton shipped consigned to a factor in the port to be stored until sold for the account of the owner. The "consigned" cotton is usually delivered to a compress yard, where after sampling it is stored, and also, when sold and ordered shipped by the buyer, is removed from storage and if "flat", is compressed and then drayed to the wharf to await arrival of the ship. It is therefore advantageous to position the buildings J and K close to the compress N and close to the sorting sheds L and M. It will therefore be seen that all of the buildings of the plant are designed and positioned with due regard to the convenience of handling the cotton.

From the foregoing description it will be obvious that cotton may be unloaded from ships at the wharf and loaded on the trains passing over the tracks 5 running in front of the wharf buildings, or loaded on the trackless trains or other vehicles capable of traversing the various platforms and runways. If the cotton is loaded on the railway trains at the wharf, it may be transferred to the proper part of the plant by switching the train over the proper railroad tracks. If the cotton is transferred by means of vehicles, such as the trackless trains 32 operating upon the elevated floor of the wharf, it may be quickly and directly transported to its point of destination over the elevated runways and balconies. As the elevated runways pass over the railroad tracks, it is obvious that the existence of the railroad tracks and the passage of trains through the plant will not interfere with the quick and direct transporting of the cotton from the elevated floor of the wharf to the proper interior points of the plant. It is immaterial whether the cotton is to be transferred directly to one of the compartments of the warehouses, or whether it is to be first transferred to a sorting shed or the compress, so far as the accessibility of these points is concerned, as the elevated runways serve to place all parts of the plant in direct communication with the wharf.

If the cotton is received non-compressed, it is handled in the manner above described and carried to the compress N. It may then go through the same routine as to ranging, sampling and pressing as the cotton which is received by rail. Compressed consigned cotton received by boat may be delivered to the various platforms for ranging and sampling in preparation for storage in one of the warehouses.

If the cotton reaches the plant in freight cars it may, if non-compressed or flat, be switched in front of the compress N over the tracks 30 where it may be unloaded, ranged and sampled and then transferred to the presses. After it is compressed, it may be moved by the trackless trains or cranes to its assigned compartment. Compressed, "consigned" and "F. O. B." cotton when received by rail may be sorted by carloads in the terminal yards and then switched directly to the track which serves the buildings or wharves to which it is assigned. Compressed "through" cotton if received by rail may also be sorted by carloads and switched directly to the wharf tracks 5 or 26 and unloaded to ship or to be temporarily stored in buildings E and F or wharf sheds A, B, C and D. "Consigned" and "F. O. B." compressed cotton may be ranged and sampled on the various platforms under the elevated runways, on the floors and at the entrance of each of the various compartments.

The cranes 40 operating upon the crane tracks 36 serve to transfer the cotton from the interior of the compartments to the warehouse balconies, or vice versa, so that vehicles passing over the runways are loaded and unloaded on the warehouse balconies. If it is desired to remove the cotton for some reason from one or more compartments of one of the warehouses to the sorting sheds, the same may be done by loading the cotton on vehicles or the trackless trains 32 on the balcony of the warehouse and then transferring the cotton to the sorting shed over the runways, or as the crane tracks in the compartments over which the cotton is to be removed passes directly through the sorting sheds, the traveling cranes may be utilized for removing the cotton to the sorting shed. After sorting the cotton in the sheds L and M, it may be removed to its proper compartment, either by means of the traveling cranes or by the vehicles passing over the elevated runways. It is even possible to transfer the cotton from the sorting sheds to the proper compartments, or vice versa, by means of the railroad trains if so desired.

It will, of course, be understood that any desired number of buildings may be used in the plant, depending upon the desired capacity thereof. Furthermore, the arrangement of the buildings disclosed in the drawings although advisable in the present instance, may be changed in various ways to suit requirements without departing from the spirit of the invention. Although the plant has been described in connection with the handling of cotton, it will be understood that the principles of storage, handling and transportation involved in the plant herein disclosed, are equally applicable to other commodities such as bags of sugar, coffee or hogsheads of tobacco, bales of Sisal grass and the like.

What I claim is:—

1. A plant of the kind described comprising a plurality of storage buildings and an elevated runway located at each side of each of said buildings and designed for vehicular traffic, all of said runways being interconnected, and vehicular elevators and lowerators placing said runways in communication with the level below the same.

2. A plant of the kind described, comprising a plurailty of storage buildings, a runway adjacent each side of each of said buildings, all of said runways being interconnected, crane tracks passing through each of the alined buildings, at least one crane track running at right-angles to said first-named crane track, a crane operable on the first mentioned tracks and a carriage operable on the last mentioned track and adapted to receive the crane and transfer it from one to another of the first mentioned tracks, whereby articles may be transferred from any point in one building to any point in the same or other buildings.

3. A plant of the kind described, comprising a plurality of separate storage buildings, each of which is divided into a plurality of storage compartments, a runway designed for vehicular traffic and passing completely around each of said buildings and in communication with the corresponding runway of each adjacent building, a series of crane tracks passing in one direction through the buildings and crossing the runways, at least one transverse crane track running substantially at right-angles to said series of crane tracks, a crane operable on the first mentioned tracks, and a carriage operable on the last mentioned track and adapted to receive the crane and transfer it from one to another of the first mentioned tracks, for the purpose described.

4. A plant of the kind described, comprising a multiple-story wharf, loading and unloading devices to transfer articles to or from the upper story of said wharf, a plurality of separate buildings divided into storage compartments, said buildings being located inland of said wharf, an elevated vehicular runway running rearwardly from the wharf past said buildings and placing the upper story of the wharf in communication with all of said buildings, and article-handling devices including a series of crane tracks passing through the buildings in one direction and at least one crane track passing transversely of said first-named tracks, for the purpose described.

5. A plant of the kind described, comprising a plurality of spaced buildings, an elevated inclosed vehicular runway having a portion passing by each side of each of said buildings to place all of the same in communication, platforms associated with said buildings and located under said runways, and vehicular elevators and lowerators for placing the runways and platforms in communication.

6. A plant of the kind described, comprising a two-story wharf, a plurality of spaced buildings located inland of the wharf, a plurality of ground-level platforms associated with said buildings, an elevated runway running rearwardly from the wharf past said buildings and placing the upper story of the wharf in communication with said buildings, and a plurality of vehicular elevators and lowerators for placing said platforms and runways in communication.

7. A plant of the kind described, comprising a multiple-story wharf, a plurality of spaced rows of buildings divided into storage compartments, an elevated runway running rearwardly from the upper story of said wharf past the buildings of each row, elevated balconies associated with said buildings and serving to connect said runways, said balconies being in communication with said storage compartments, a series of crane tracks passing through the storage compartments of the buildings and at least one crane track running transversely of said series of crane tracks, for the purpose described.

In testimony whereof I affix my signature.

WILLIAM von PHUL.